(12) United States Patent
Rumpler et al.

(10) Patent No.: US 6,611,398 B1
(45) Date of Patent: Aug. 26, 2003

(54) TAPE HEAD WITH SUPPORT BARS

(75) Inventors: Allen G. Rumpler, Pleasanton, CA (US); James R. Remby, Hopkinton, MA (US); Ming Ho Lau, Shrewsbury, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/370,456

(22) Filed: Aug. 9, 1999

(51) Int. Cl.[7] .......................... G11B 5/10; G11B 5/265; G11B 5/187
(52) U.S. Cl. .................... 360/129; 360/121; 360/122
(58) Field of Search ................ 360/129, 121, 360/122

(56) References Cited

U.S. PATENT DOCUMENTS

| 3,610,839 | A | * | 10/1971 | Sand | |
|---|---|---|---|---|---|
| 3,881,190 | A | * | 4/1975 | Brock et al. | 360/122 |
| 4,044,392 | A | * | 8/1977 | Brock et al. | 360/129 |
| 4,571,651 | A | * | 2/1986 | Reid et al. | 360/121 |
| 4,967,299 | A | * | 10/1990 | Katoh et al. | 360/129 |
| 5,237,476 | A | * | 8/1993 | Bischoff et al. | 360/121 |
| 5,513,057 | A | | 4/1996 | Zieren et al. | 360/122 |
| 5,883,770 | A | | 3/1999 | Biskeborn et al. | 360/130.21 |
| 6,038,108 | A | * | 3/2000 | Dee et al. | 360/121 |
| 6,246,535 | B1 | | 6/2001 | Saliba et al. | |

FOREIGN PATENT DOCUMENTS

| EP | 0 515 786 A1 | 12/1992 |
|---|---|---|
| WO | WO97/05603 | 2/1997 |

* cited by examiner

*Primary Examiner*—Craig A. Renner
(74) *Attorney, Agent, or Firm*—Morrison & Foerster LLP (57) ABSTRACT

A head for a tape drive system has a plurality of transducers formed on a substrate and protected by a cover bar, with a tie bar bonded to the cover bar. The tie bar extends along a tape-facing surface beyond the cover bar, enhancing the structural integrity of the head. Wear bars may be bonded to the substrate, cover bar and tie bar. Alternatively, the tie bar may have a notch within which the substrate and cover bar are bonded. The tie bar reduces misalignment and instability of the transducers, providing increased storage capacity and greater reliability and durability of the tape drive system.

23 Claims, 8 Drawing Sheets

TAPE HEAD WITH SUPPORT BARS

TECHNICAL FIELD

The present invention relates to heads or transducers for tape drive storage systems.

BACKGROUND OF THE INVENTION

Multichannel or multitrack tape drives have been known for many years. Currently, such drives may be employed for audio, video or computer applications, and may read and write signals in analogue or digital form.

The rapid growth of the Internet has fostered a need for inexpensive data backup systems, for which tape drives have been employed. The increasing need for data storage, however, has placed increasing demands on tape drive storage capacity. To satisfy this need for storage, spacing between tracks can be reduced, more tracks can be provided on each tape, bits can be packed more closely on each track, or tape speed and/or length can be increased. Unfortunately, rapidly moving tapes and heads do not always accurately read or write data as these modifications are made to increase storage capacity.

Figure 1:
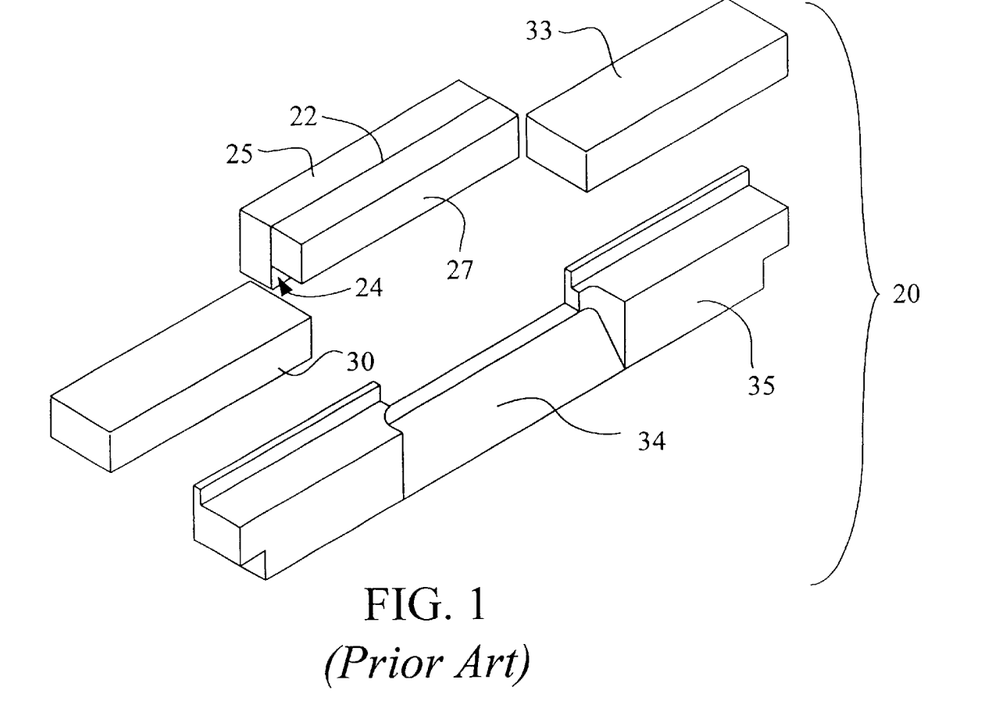
FIG. 1 is perspective view of the components of an unfinished prior art tape-head assembly.

FIG. 1 shows several prior art tape-head components 20 before assembly and finishing. The components 20 include a number of microscopic transducers 22 that have been formed along a surface 24 of a substrate 25 that has been covered with a cover bar or head cap 27. Numerous process steps have been performed to create the transducers 22 on the substrate 25, making this component relatively expensive. The cover bar 27 protects the expensive transducers 22. Wear bars 30 and 33 are positioned adjacent ends of the joined substrate 25, transducers 22 and cover bar 27, to which the wear bars are to be bonded. The wear bars provide a cost-effective means for extending the surface of the tape-head that contacts the tape. After adding the wear bars, the bonded substrate and wear bars are fit into a bed 35 that holds the components together. An aperture 34 in the bed 35 allows for insertion of a flex-cable, not shown, containing leads connecting to transducers 22 along surface 24.

Figure 2:
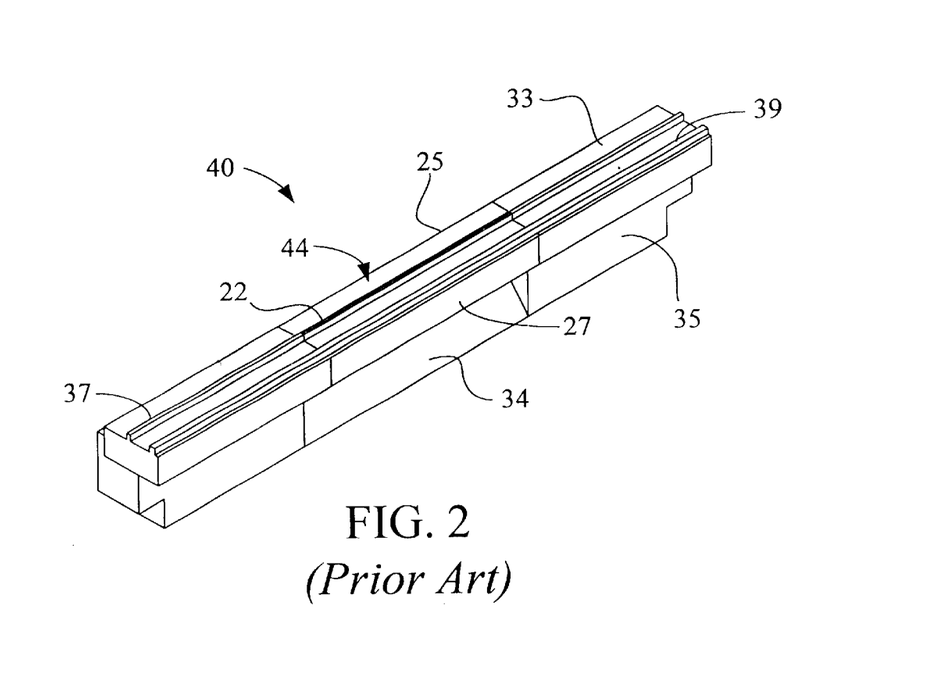
FIG. 2 is a perspective view of the prior art tape-head assembly of FIG. 1, as finished.

FIG. 2 shows a finished tape-head assembly 40 made from the components of FIG. 1. A pair of rails 37 and 39 are formed on a tape-facing surface 44 of the assembly. Although this device has performed adequately, challenges in reducing tolerances and errors exist, so that increasing data storage density and reducing access time has been difficult.

SUMMARY OF THE INVENTION

An object of the present invention is to provide increased micro-mechanical accuracy in a tape-head assembly for a tape drive system, thereby providing increased storage capacity. This object is achieved by providing tape-heads having increased structural integrity and/or decreased errors in positioning. Manufacturing advantages can also be achieved with the present invention.

DETAILED DESCRIPTION OF THE PREFERRED EMBODIMENTS

Figure 3:
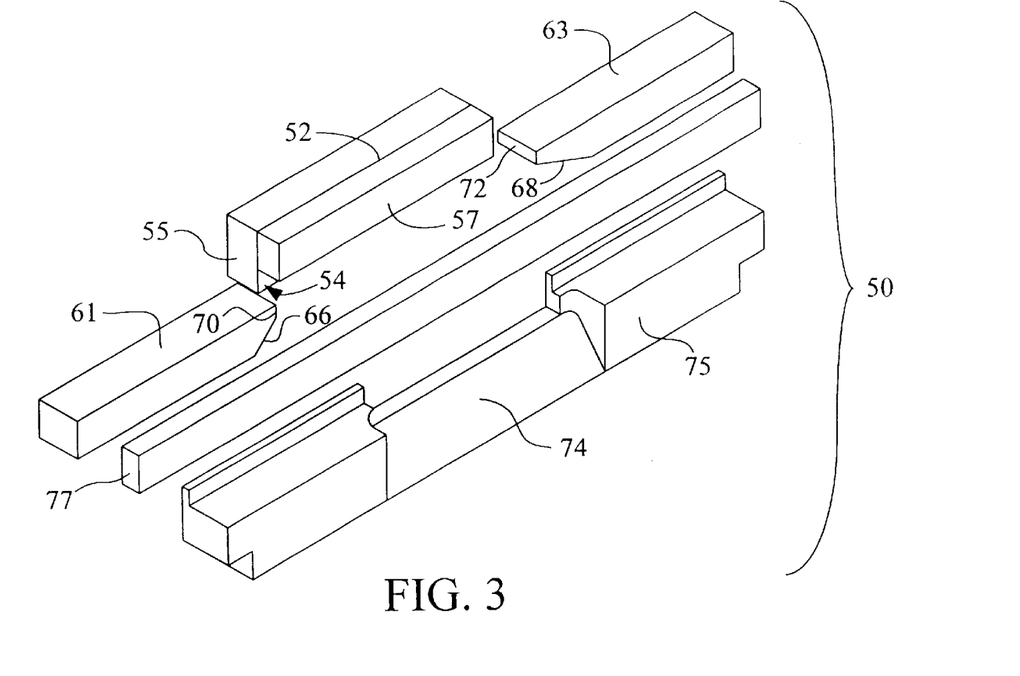
FIG. 3 is a perspective view of some components of an unfinished tape-head assembly of the current invention.

Referring now to FIG. 3, some components 50 of an unfinished tape-head assembly of the current invention are shown. Much as described above, a number of microscopic transducers 52 have been formed along a surface 54 of a substrate 55 that has been covered with a cover bar or head cap 57. The transducers 52 along surface 54 are used for reading and writing on the multiple tracks of the tape, not shown, the number of transducers preferably ranging between two and sixteen, although more or less are possible. Each of the transducers 52 may contain a magnetoresistive read element as well as an inductive write element. A pair of wear bars 61 and 63 are positioned adjacent ends of the joined substrate 55, transducers 52 and cover bar 57, to which the wear bars are to be bonded. The wear bars 61 and 63 have a tapered edges 66 and 68 adjacent the substrate 55 and cover bar 57, providing greatly reduced area of faces 70 and 72 for bonding. This reduced area of faces 70 and 72 allows bonds with those faces to be thinner and more exact, reducing errors in positioning of the transducers 52. The tapered edges 66 and 68 provide increased access for material that may be used in that bonding.

After bonding of the thin faces 70 and 72 to the substrate 55 and cover bar 57, a tie bar 77 is attached to the cover bar 57 and wear bars 61 and 63. The joined tie bar 77, wear bars 61 and 63 and substrate 55 are then bonded with a bed 75 to form the integrated structure shown in FIG. 4. An aperture 74 in the bed 75 allows for insertion of a flex-cable, not shown in this figure, containing leads connecting to transducers 52 along surface 54.

Figure 11:
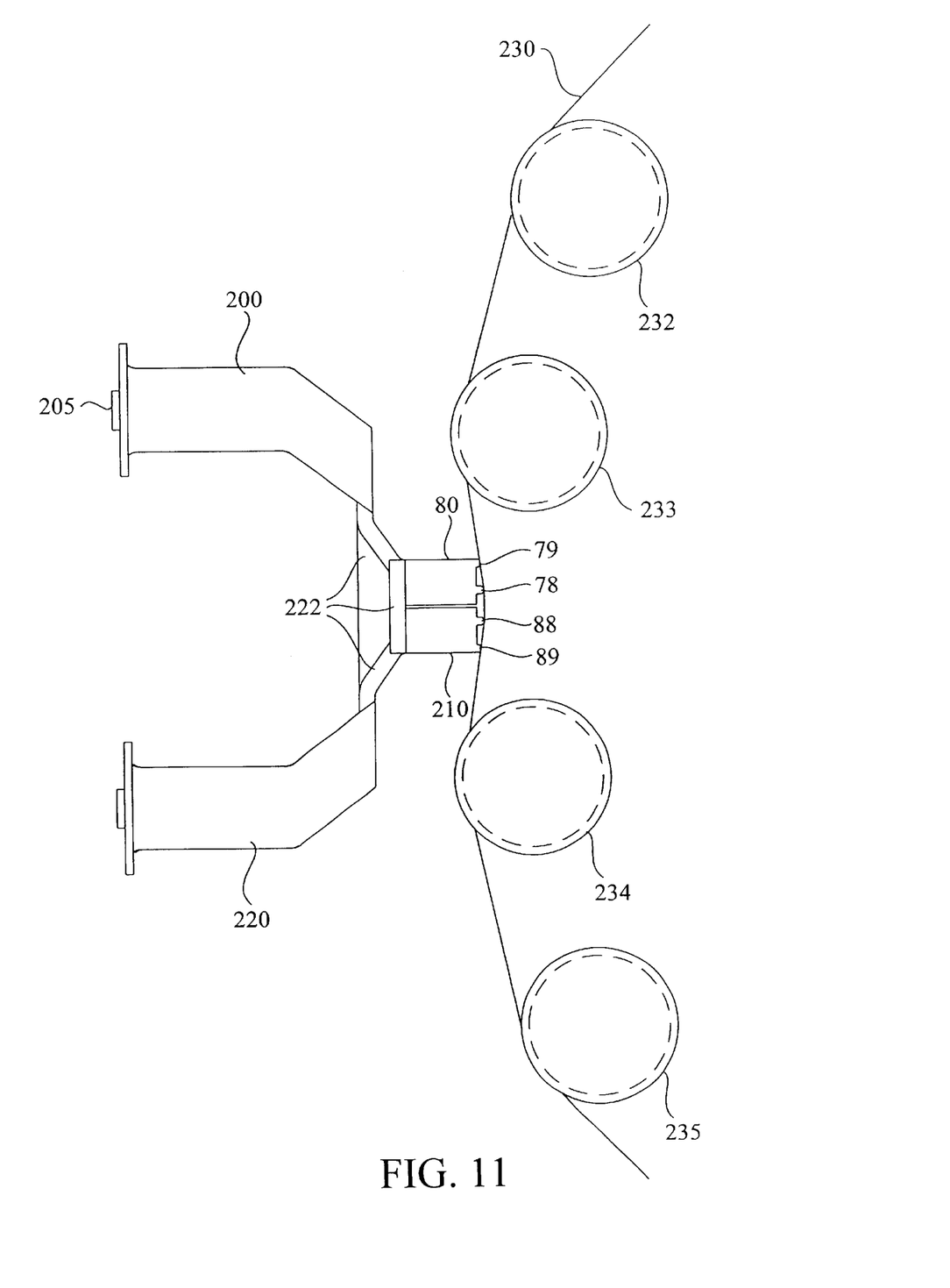
FIG. 11 is a view of the flexible cable and tape-head-arm assembly of FIG. 10 interacting with a section of tape winding over rollers.

A pair of rails 78 and 79 are formed on a transducing, tape-facing surface 76 of an assembly 80 formed from the components 20 of FIG. 3, with the transducers 52 disposed atop rail 78. As illustrated in FIG. 11, rails 78 and 79 project from the tape-facing surface to press against the tape, which curves around the rails, so that the transducers 52 remain close to the tape for high resolution. Forming rail 79 on the tie bar 77 instead of the cover bar 57 avoids damage and misalignment of the cover bar and provides a jointless structure for the rail.

Attachment of the tie bar 77 provides increased strength and accuracy in a number of ways. First, the tensile and compressive strength along the length of the tie bar 77 improves lateral positioning accuracy of the transducers 52 relative to a tape that is flowing past. This improved lateral accuracy increases correspondence between the transducers and each track they communicate with, improving on-track performance. Increased on-track performance allows track and transducer widths to be decreased, increasing storage density across the width of a tape. The attachment of the tie bar 77 to the cover bar 57 also reduces the ability of the cover bar to move toward or away from the tape. Since the cover bar 57 is bonded to the transducers 52, this improved perpendicular resilience of the assembly 80 reduces motion such as vibrations of the cover bar and transducers 52 toward and away from the tape, maintaining a more uniform proximity of the transducers 52 to the tape. Increased perpendicular stiffness can increase resolution of and/or decrease the length of each recorded bit along the tape, thereby increasing linear density. Similarly, the tie bar 77 provides increased longitudinal resilience of the assembly 80 to the longitudinal travel of the tape, which combats friction from the tape that can tug on the rails 78 and 79 with a varying force. This longitudinal stiffness can also increase transducer resolution of and/or decrease the length of each recorded bit along the tape, thereby increasing linear density.

The combination of increased lateral, longitudinal and perpendicular resilience of the present invention affords increased density in both track width and length directions, which provides greatly increased areal storage density. Moreover, due to the multiple means of improved resilience to vibration and other submicron movements, tape speed and therefore access time and storage capacity per unit of time can be increased. Decreasing such micromechanical movement and errors in positioning also decreases pockets and voids that can otherwise inadvertently occur, the pockets typically filling with contaminants that erode the tape and reduce the drive lifetime.

Figure 5:
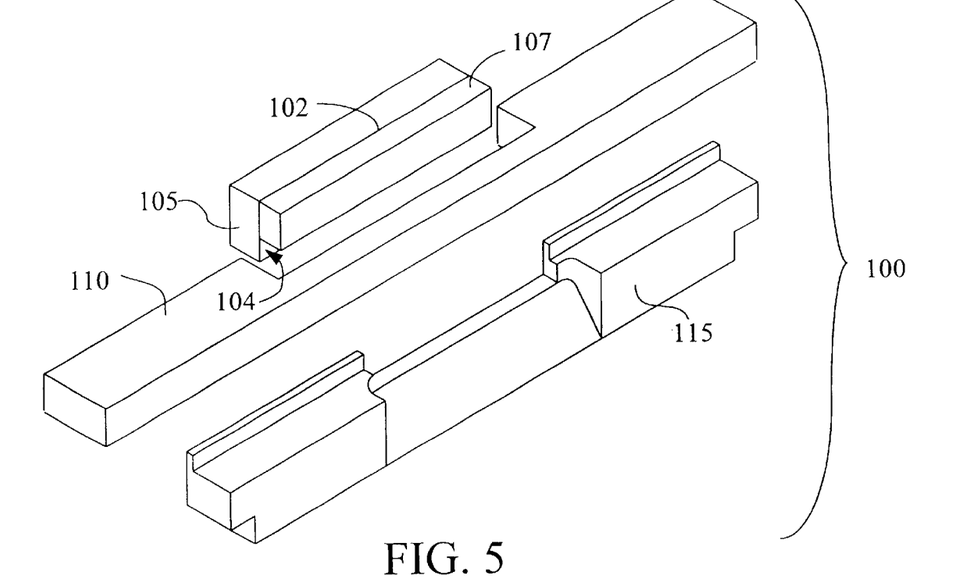
FIG. 5 is a perspective view of some components of a second embodiment of the current invention.

FIG. 5 shows some components 100 of another embodiment of the present invention, including multiple transducers 102 formed on a surface 104 of a substrate 105, with the transducers covered by a cover bar 107. An integrated support or tie bar 110, which serves similar functions as the bonded wear bars and tie bar of the previous embodiment, is fitted around and attached to the substrate 105 and cover bar 107. The bonded tie bar 110, substrate 105 and cover bar 107 are fitted into and bonded to a bed 115, and then rails are formed much as in the previous embodiment for use in a tape drive system.

Figure 6:
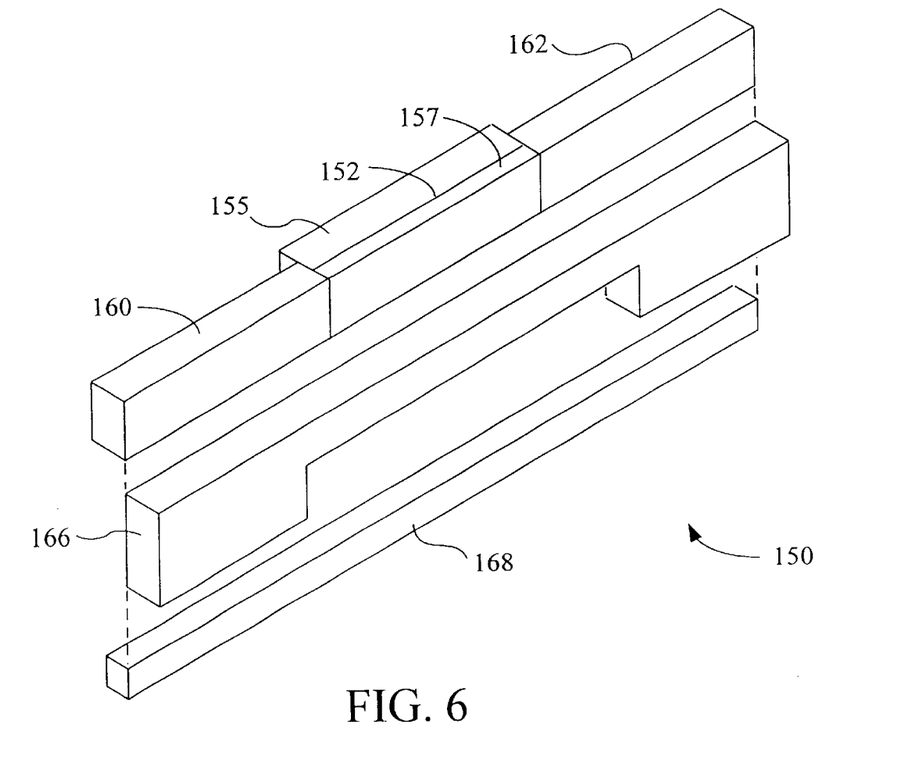
FIG. 6 is a perspective view of some components of a third embodiment of the current invention.

FIG. 6 shows some components 150 of yet another embodiment of the present invention, which again has a number of transducers 152 formed on a surface of a substrate 155, with the transducers covered by a cover bar 157. A pair of wear bars 160 and 162 are bonded to the cover bar 157, and a spacer bar 166 is bonded to the cover bar 157 and wear bars 160 and 162. A base bar 168 is bonded to the substrate 155, wear bars 160 and 162 and spacer bar 166, locking the components 150 into place, after which rails are formed as described above.

Figure 7:
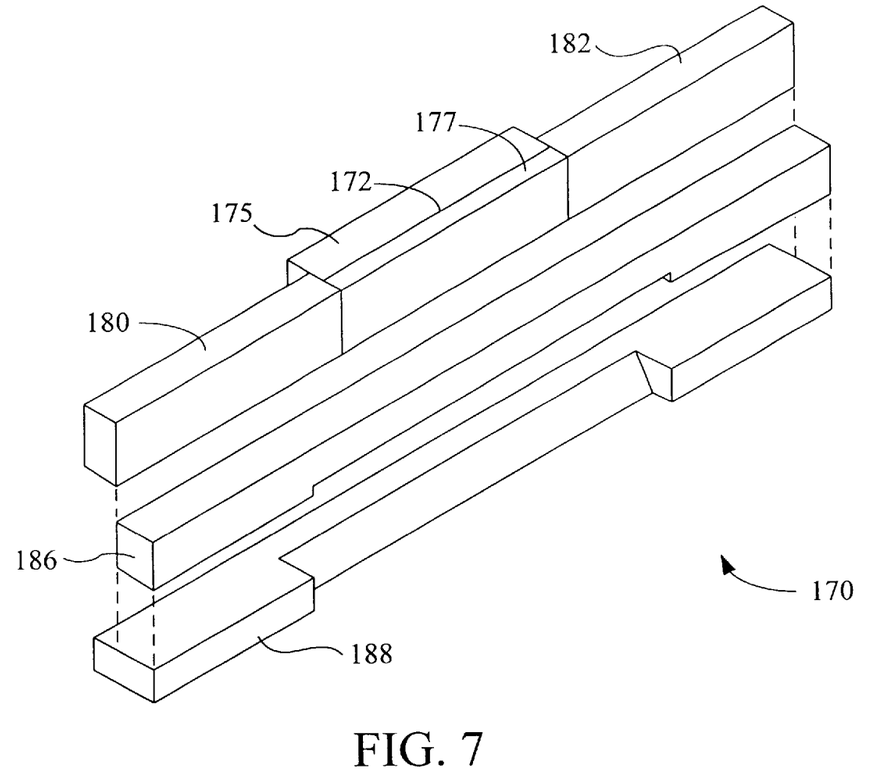
FIG. 7 is a perspective view of some components of a fourth embodiment of the current invention.

FIG. 7 shows some components 170 of a similar embodiment to that illustrated in FIG. 6, which again has a number of transducers 172 formed on a surface of a substrate 175, with the transducers covered by a cover bar 177. A pair of wear bars 180 and 182 are bonded to the cover bar 177, and a spacer bar 186 is bonded to the cover bar 177 and wear bars 180 and 182. A base bar 188 is bonded to the substrate 175, wear bars 180 and 182 and spacer bar 186, locking the components 170 into place, after which rails are formed as described above.

The various bars described above are preferably made of ceramic materials such as $Al_2O_3$—TiC, while bed 75 is preferably made of a machinable or moldable ceramic having a thermal coefficient of expansion close to that of $Al_2O_3$—TiC. A currently preferred ceramic for use in bed 75 is sold under the trademark Macor by Accuratus Ceramic Corporation of Washington, New Jersey and includes, in decreasing amounts, silicon, magnesium, aluminum, potassium, boron and fluorine. The bonding of the components may be accomplished with an epoxy glue, although other known bonding methods are also possible.

All of the embodiments described above allow several ceramic and/or metal components to be bonded together into a structure having a greater bond strength and improved bond line reliability. The present invention also conserves expensive substrate and transducer real estate, while the components fit together in a manner lowering manufacturing costs and improving alignment. Once the components are bonded together, the resulting devices form a reliable foundation that minimizes submicron movements of the components. The additional support provided by these assemblies improves accuracy of lapping the transducers and machining of the rails and contouring the tape-facing surfaces, and increases coplanarity of these surfaces after such working.

Figure 4:
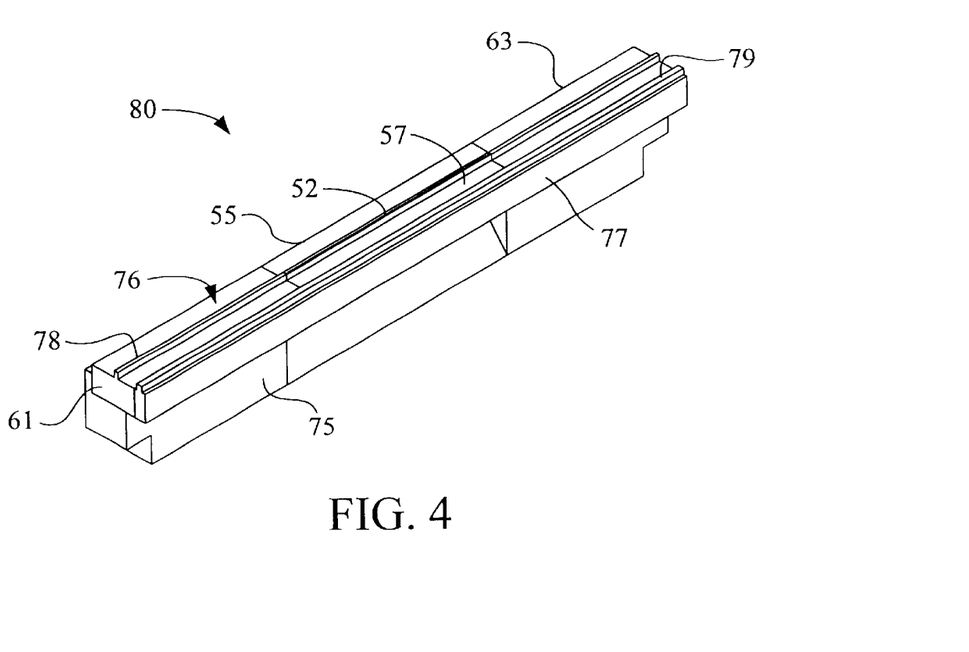
FIG. 4 is a perspective view of the tape-head assembly of FIG. 3, as finished.
Figure 8:
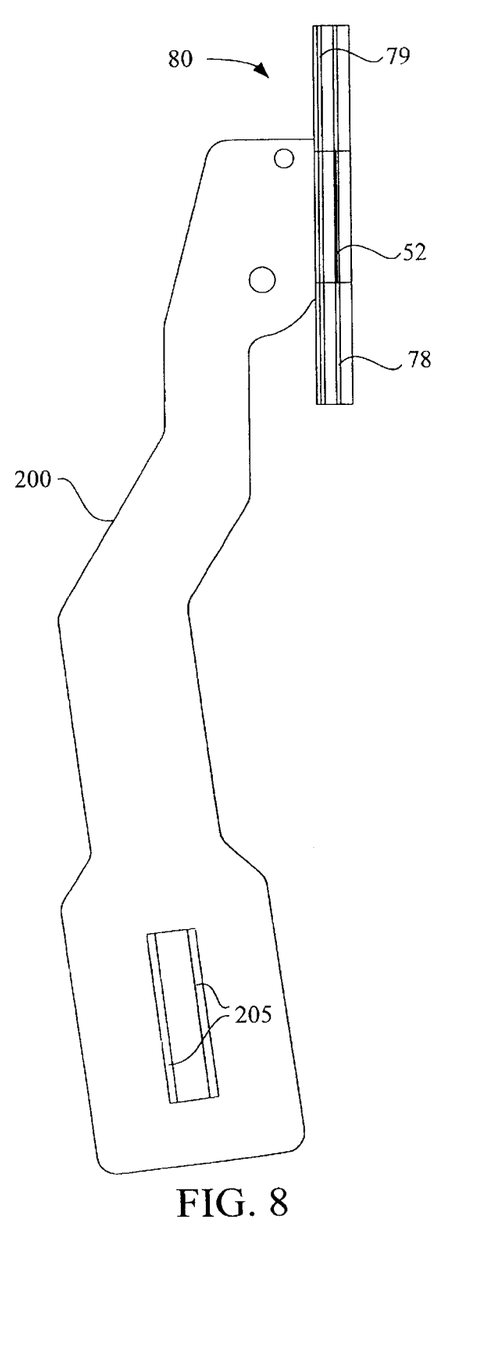
FIG. 8 is a view of a media-facing side of the tape-head assembly of FIG. 4 connected to a flexible cable containing conductive leads.

FIG. 8 shows the tape-head assembly 80 of FIG. 4 attached to a flexible cable 200 that includes a number of conductive traces which provide electrical connections between the transducers 52 and a pair of rows of pins 205. The pins 205 can plug into a board to provide electrical connection with the drive electronics. For the head 80 having eight read/write transducers 52, about forty pins 205 and conductive leads are included on flexible cable 200, the leads not shown in this figure as they would tend to confuse rather than explain the invention. The rails 78 and 79 are apparent in this view of the tape-facing side of the assembly.

Figure 9:
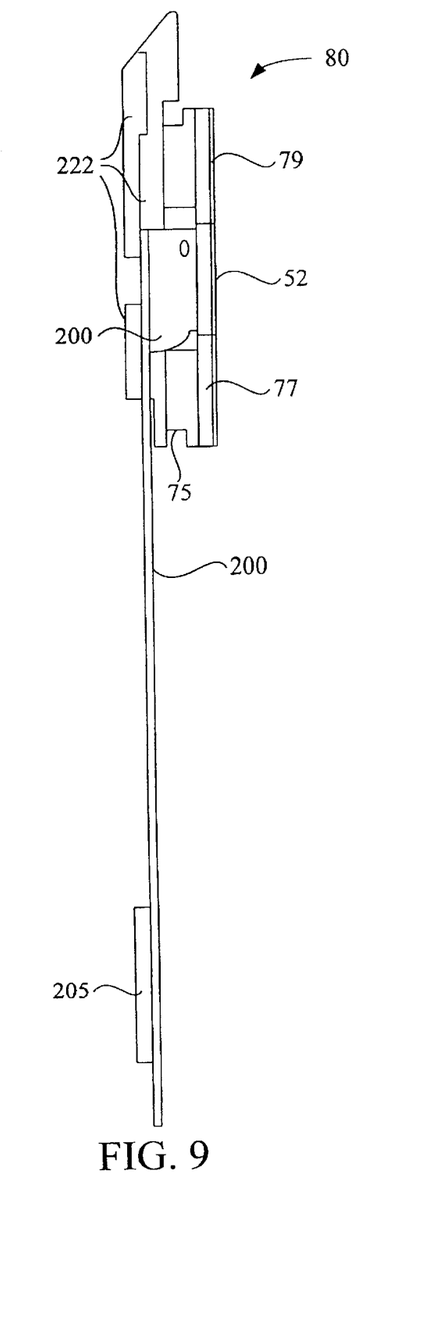
FIG. 9 is a side view of the tape-head assembly and flexible cable of FIG. 8, mounted on an arm for positioning the assembly adjacent a tape.

FIG. 9 is a side view of the tape-head assembly 80 and flexible cable 200 of FIG. 7, in which the bed 75 and tie bar 77 are also apparent. A bracket or arm 222 is bonded to the bed 75, with the cable 200 attached to the arm and bending to connect with the transducers 52. A raised area 230 of the arm 222 provides a mount 225 for a servo mechanism 228 shown in FIG. 12 and described in detail in copending U.S. patent application Ser. No. 09/191,766, entitled Optical Apparatus for Tracking a Magnetic Tape, filed Nov. 13, 1998, and incorporated herein by reference.

Figure 10:
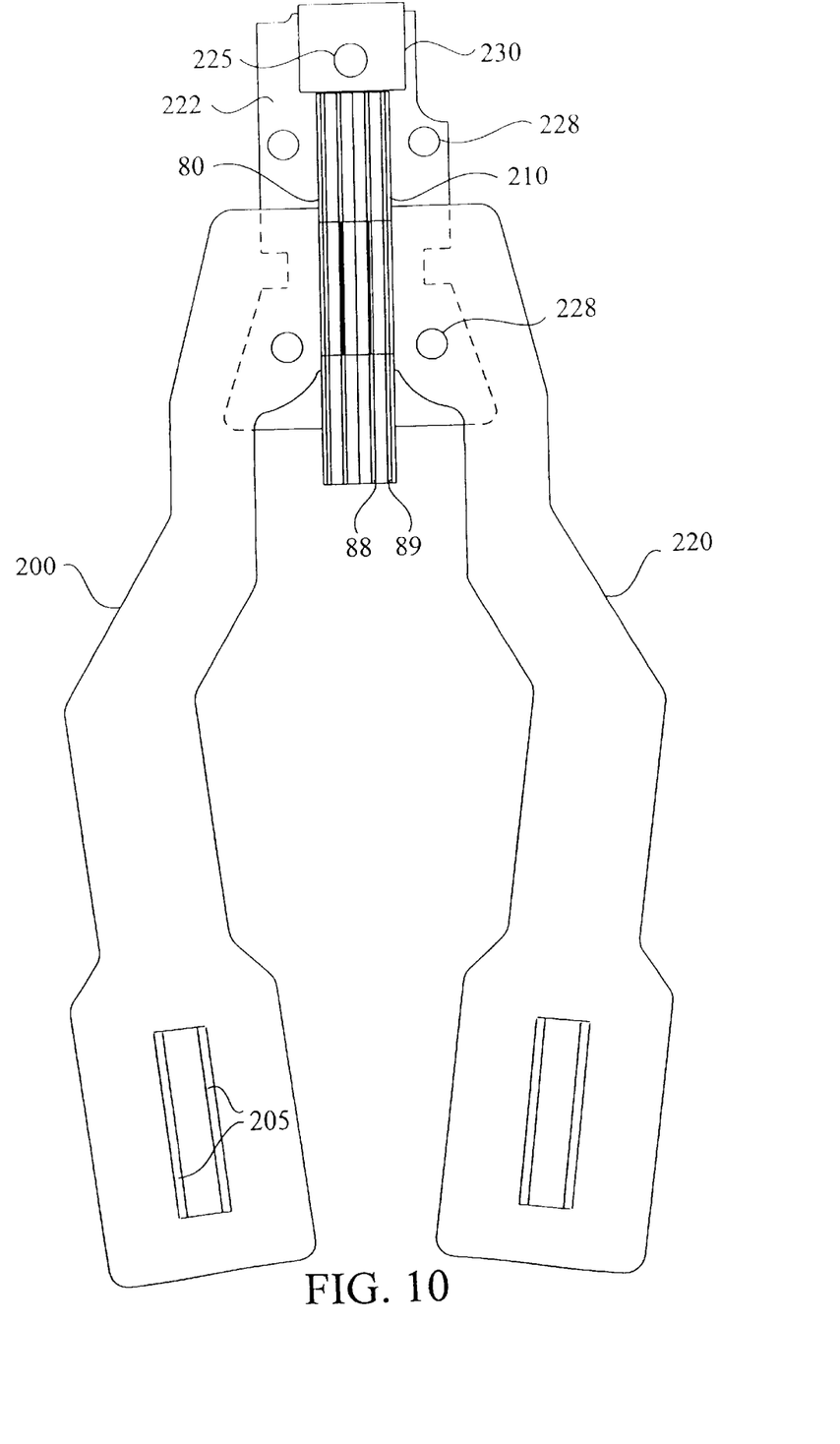
FIG. 10 is a view of a media-facing side of the tape-head-arm assembly of FIG. 9, including a second tape-head also mounted on the arm for use in a tape drive.

FIG. 10 shows the head 80 and flexible cable 200 of FIG. 7 in combination with another head 210 and flexible cable 220, the head 210 having rails 88 and 89. The arm 222 holds the heads 80 and 210 and flexible cables 200 and 220 for positioning against a tape within a drive, not shown in this figure. A raised portion 230 of arm 222 abuts the heads 80 and 210. The heads 80 and 210 allow the drive to read while writing without excessive noise interference.

FIG. 11 shows the heads 80 and 210 and flexible cables 200 and 220 of FIG. 10 engaging a tape 230 during reading and writing. The flexible cables 200 and 220 are bent in several locations, allowing rails 78, 79, 88 and 89 to be oriented toward the tape 230. The tape 230 winds along rollers 232, 233, 234 and 235, to arc over rails 78, 79, 88 and 89. Arm 222 holds heads 80 and 200 and is coupled to an actuator, not shown, for moving the transducers on rails 78 and 88 to various tracks on the tape 230.

Figure 12:
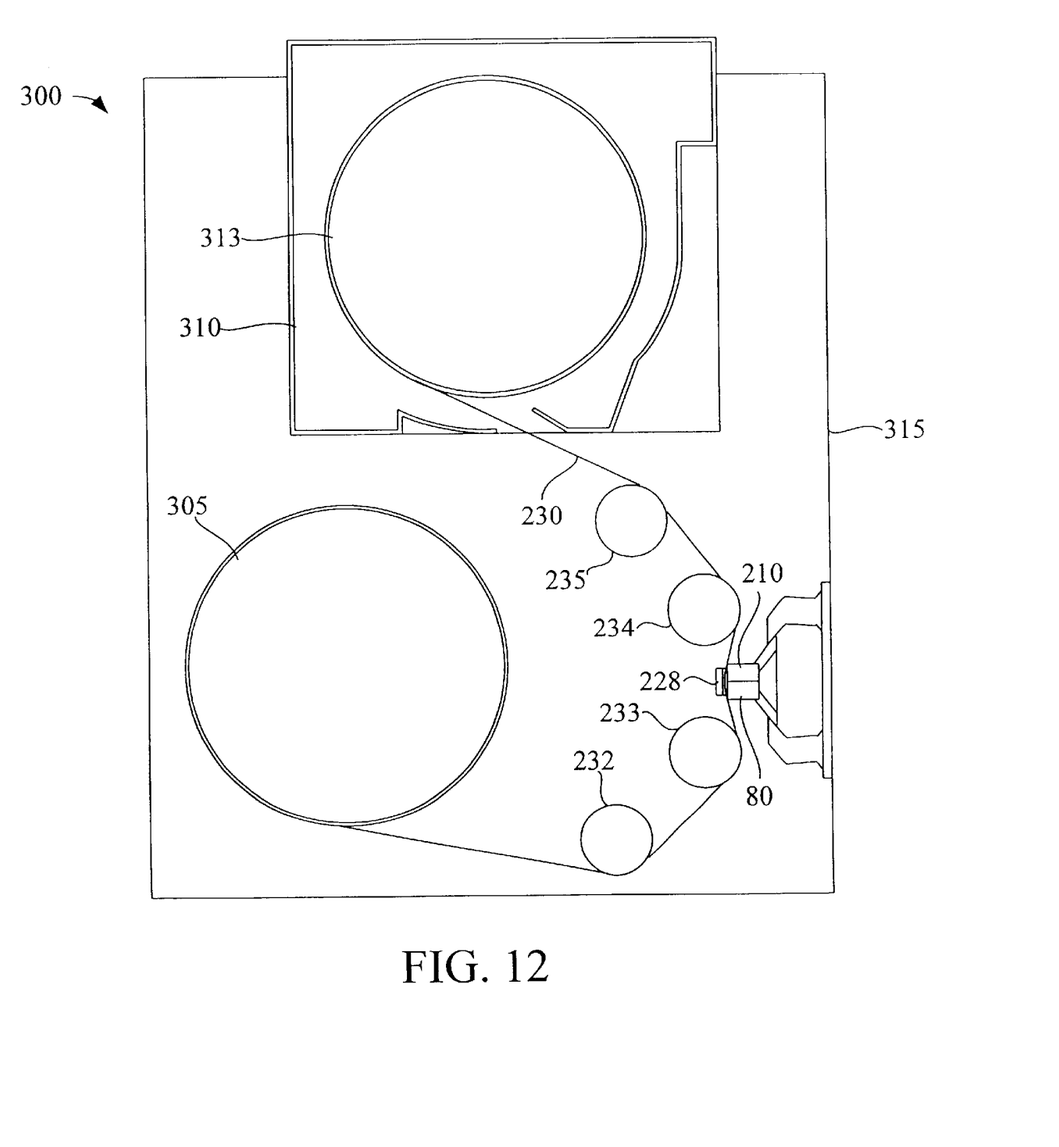
FIG. 12 is an opened up plan view of a tape drive containing the tape-head-arm assembly and tape of FIG. 11 winding over rollers between reels.

The heads 80 and 210 of the present invention may be disposed in a drive 300, such as shown in FIG. 12. The drive

300 has a reel 305 for winding and unwinding tape 230, and includes a cartridge 310 that contains another reel 313 and is inserted into case 315. Rollers 232–235 provide a tensioned path for the tape 230 between reels 305 and 313. The tape in this example may be hundreds of feet in length, travel at speeds of around ten feet per second and contain several hundred tracks, making accurate positioning of the heads essential. Reduction in microscopic movement and positioning errors of the heads provided by the present invention, as well as increased durability, greatly improves the performance of the drive.

Although we have focused on teaching the preferred embodiments, other embodiments and modifications of this invention will be apparent to persons of skill in the art in view of these teachings. Therefore, this invention is to be limited only by the following claims, which include all such embodiments and modifications when viewed in conjunction with the above specification and accompanying drawings.

What is claimed is:

1. A device for a tape drive system, the device comprising:
   a plurality of bodies each comprising a transducer, a substrate, and a cover bar, with said transducer sandwiched between said substrate and said cover bar, and said transducer, substrate and cover bar sharing a tape-facing surface that has an elongate direction, and
   a plurality of tie bars, wherein each of said bodies has a corresponding tie bar comprising a separate member from said substrate, said corresponding tie bar being bonded to said cover bar distal to said substrate and extending along said tape-facing surface in said elongate direction further than said cover bar, whereby misalignment and instability of said transducer is reduced.

2. The device of claim 1, wherein each body further comprises a pair of wear bars abutting said corresponding tie bar, substrate and cover bar.

3. The device of claim 1, wherein each body further comprises a support bar abutting a non-tape-facing surface of said tie bar and said cover bar.

4. The device of claim 1, wherein each body further comprises a pair of wears bars abutting said tie bar and said cover bar.

5. The device of claim 1, wherein each body further comprises a wear bar having a tapered section disposed adjacent to said cover bar.

6. The device of claim 1, wherein each body further comprises a plurality of transducers disposed between said cover bar and said substrate.

7. The device of claim 1, wherein said tape-facing surface includes a plurality of rails, with a first of said rails containing said transducer and a second of said rails disposed on said tie bar.

8. A head assembly for a tape drive system comprising:
   a plurality of structures, each structure being formed of a plurality of solid components, including a substrate, and a cover bar, with a plurality of transducers disposed between said substrate and said cover bar,
   a plurality of tie bars wherein each of said structures has a corresponding tie bar comprising a separate member from said substrate, said substrate, cover bar and transducers of each substrate and the corresponding tie bar sharing a tape-facing surface that has an elongate direction, wherein said corresponding tie bar extends along said tape-facing surface in said elongate direction further than said cover bar with said cover bar bonded to said corresponding tie bar and disposed between said corresponding tie bar and said substrate, whereby misalignment and instability of said transducers is reduced.

9. The head assembly of claim 8, wherein each of the structures further comprises a plurality of wear bars bonded to said substrate and said corresponding tie bar.

10. The head assembly of claim 9, wherein said wear bars are tapered adjacent to said cover bar.

11. The head assembly of claim 9, wherein said wear bars each have a cross section and a bonding surface substantially parallel to said cross section, with said bonding surface having a smaller area than said cross section and being bonded to said cover bar.

12. The head assembly of claim 8, wherein each tie bar has a rail projecting from said tape-facing surface.

13. A system for information storage or retrieval comprising:
   a tape including a recording medium, said tape being wound on a plurality of rollers, and
   a head assembly for communicating with said medium, said head assembly comprising:
   a plurality of structures each of which includes a plurality of transducers, a substrate, and a cover bar, with said transducers being disposed between said substrate and said cover bar, and said transducers, substrate and cover bar sharing a tape-facing surface that has an elongate direction; and
   a plurality of tie bars, wherein each of the structures has a corresponding tie bar comprising a separate member from the substrate, each tie bar being bonded to said cover bar of the corresponding structure distal to said substrate and extending along said tape-facing surface in said elongate direction further than said cover bar, whereby misalignment and instability of said transducers relative to said tape is reduced.

14. The system of claim 13, wherein each structure further comprises a pair of wear bars each having a tapered section disposed adjacent to said cover bar.

15. The system of claim 13, wherein said tape-facing surface includes a plurality of rails, with a first of said rails containing said transducers and a second of said rails disposed on said tie bar.

16. A device for a tape drive system, the device comprising:
   a plurality of tape-head assemblies each comprising a body and a corresponding tie bar attached to the body, wherein said body comprises a transducer, a substrate, and a cover bar, with said transducer disposed between said substrate and said cover bar, and said transducer, said substrate, and said cover bar sharing a tape-facing surface that has an elongated direction,
   wherein said tie bar comprises a separate member from said substrate, said tie bar being bonded to a portion of the body to which it corresponds and extending with respect to said tape-facing surface in an elongate direction further than said cover bar, whereby misalignment and instability of said transducer is reduced, and
   wherein the corresponding tie bar is disposed laterally adjacent to the cover bar with respect to said tape-facing surface and is bonded to said cover bar.

17. The device of claim 16 wherein each body further comprises a pair of wear bars abutting said substrate and said cover bar and arranged in the elongate direction, the corresponding tie bar being disposed laterally adjacent to said wear bars and being bonded thereto.

18. The device of claim 16 wherein each body further comprises a support bar abutting a non-tape facing surface of said tie bar and said cover bar.

19. The device of claim 16 wherein each body further comprises a wear bar having a tapered section disposed adjacent to said cover bar.

20. The device of claim 16 wherein each body further comprises a plurality of transducer disposed between said substrate and said cover bar.

21. The device of claim 16 wherein each tie bar comprises a rail disposed thereon.

22. The device of claim 21 wherein each body further comprises a second rail disposed on said cover bar and projecting vertically from said tape-facing surface.

23. The device of claim 22 wherein said transducer is disposed on said second rail.

* * * * *